United States Patent [19]

Rausch

[11] 4,016,068

[45] Apr. 5, 1977

[54] CATALYTIC REFORMING WITH AN ACTIVATED BIMETALLIC CATALYTIC COMPOSITE

[75] Inventor: Richard E. Rausch, Mundelein, Ill.

[73] Assignee: UOP Inc., Des Plaines, Ill.

[22] Filed: June 10, 1976

[21] Appl. No.: 694,872

Related U.S. Application Data

[60] Division of Ser. No. 482,708, June 21, 1974, Pat. No. 3,968,053, which is a division of Ser. No. 406,134, Oct. 12, 1973, Pat. No. 3,864,241, which is a continuation-in-part of Ser. No. 187,579, Oct. 7, 1971, abandoned, which is a continuation-in-part of Ser. No. 807,910, March 17, 1969, Pat. No. 3,740,328.

[52] U.S. Cl. .............................. 208/139; 252/441
[51] Int. Cl.$^2$ ........................................ C10G 35/08
[58] Field of Search ...... 208/139; 252/441, 466 PT

[56] References Cited

UNITED STATES PATENTS

| | | | |
|---|---|---|---|
| 3,898,154 | 8/1975 | Rausch | 208/139 |
| 3,948,804 | 4/1976 | Rausch | 208/139 |

Primary Examiner—C. Davis
Attorney, Agent, or Firm—James R. Hoatson, Jr.; Thomas K. McBride; William H. Page, II

[57] ABSTRACT

A gasoline fraction is catalytically reformed by contacting the gasoline fraction and a hydrogen stream at reforming conditions with an activated bimetallic acidic catalytic composite comprising a combination of a platinum group component, a tin component and a halogen component with a porous carrier material, the catalytic composite having been: (1) activated by contacting same with an activating gas comprising oxygen and a halogenating component selected from the group consisting of halogen and hydrogen halide at a temperature between 700° and 1100° F. for a time of at least 0.5 to about 10 hours; and thereafter (2) reduced by contacting the resulting activated catalytic composite with a substantially water-free reducing agent at reduction conditions selected to reduce substantially all of the platinum group component to the elemental metallic state while maintaining substantially all of the tin component in an oxidation state above that of the elemental metal.

9 Claims, No Drawings

CATALYTIC REFORMING WITH AN ACTIVATED BIMETALLIC CATALYTIC COMPOSITE

CROSS-REFERENCES TO RELATED APPLICATIONS

This application is a division of my prior, copending application Ser. No. 482,708 filed June 21, 1974, now U.S. Pat. No. 3,968,053; which in turn is a division of my prior application Ser. No. 406,134 filed on Oct. 12, 1973 and now U.S. Pat. No. 3,864,241; which in turn is a continuation-in-part of my prior, now abandoned application Ser. No. 187,579 filed on Oct. 7, 1971; and which in turn is a continuation-in-part of my prior application Ser. No. 807,910 filed on Mar. 17, 1969 and now U.S. Pat. No. 3,740,328. All of the teachings of these prior applications are specifically incorporated herein by reference.

The subject of the present invention is an improvement in a catalytic reforming process in which a relatively low octane gasoline fraction is contacted with a unique bimetallic acidic catalyst containing a platinum group metal, tin and halogen at reforming conditions selected to result in a high octane product. More precisely, the invention involves the use in a process of this type of a catalyst that has been activated by halogen treating in order to substantially improve the stability characteristics of this unique acidic bimetallic catalyst. In one aspect, the invention comprises a process for activating this unique bimetallic catalyst by treating with an activating gas comprising oxygen and a halogenating component selected from the group consisting of halogen and hydrogen halide at a temperature between 700° to 1100° F. for a time of at least 0.5 to about 10 hours. In another aspect, the invention is an activated catalytic composite of a platinum group metal, tin and halogen with a porous carrier material that is formed by the instant activating process.

It is well known in the art that the requirements for an optimum process for transforming low octane stocks into high octane stocks, at minimum loss to undesirable products, involves a specially tailored catalytic environment that is designed to promote upgrading reactions for paraffins and naphthenes, which are the components of gasolines and naphthas that have the highest octane-improving potential. For paraffins the upgrading reactions are: isomerization to more highly branched paraffins, dehydrogenation to olefins, dehydrocyclization to aromatics, and hydrocracking to lower molecular weight paraffins. Of these, the dehydrocyclization reaction is the one that shows the maximum gain in octane number and is, consequently, preferred. For naphthenes, the principal upgrading reactions involve dehydrogenation to aromatics and ring isomerization and dehydrogenation to aromatics; but the increase in octane number is not as dramatic here as in the case of dehydrocyclization of paraffins since the clear research octane number of most naphthenes is relatively high, typically in the range of 65 to 80. Accordingly, catalytic reforming operations are designed to provide an optimum mixture of the aforementioned reactions, generally employing for this purpose a multipurpose catalytic composite having at least a metallic dehydrogenation component and an acid-acting component.

In my prior applications, I disclosed a unique dual-function acidic bimetallic catalytic composite which has singular characteristics of activity, selectivity and stability when utilized in processes for the conversion of hydrocarbons of the type that have traditionally used platinum-containing catalytic composites. In essence, this unique bimetallic catalyst comprises a combination of catalytically effective amounts of a platinum group component, a tin component and a halogen component with a porous carrier material, in a manner such that oxidation states and distribution of the metallic ingredients are carefully controlled. The singular characteristics of this bimetallic catalyst are perhaps nowhere more evident than in a process for the catalytic reforming of a low octane gasoline fraction in order to produce a high octane reformate product. My teachings in my prior applications was, in substance, that this bimetallic catalyst is extraordinarily sensitive to the presence of water in its environment and that it performs in an optimum fashion in a reforming process when the catalyst is maintained in a substantially water-free state. By the use of the expression "substantially water-free" I intended to describe the situation where the total amount of water, or water equivalent, continuously entering the reforming zone containing this unique catalyst is maintained at a level substantially less than 50 wt. ppm., and preferably significantly less than 20 wt. ppm. of the hydrocarbon charge stock, calculated as weight of equivalent water in the charge stock. In essence, the gist of my prior teachings on this subject was to operate this catalyst in a "bone dry" environment with no water addition in order to achieve best results. Although my subsequent experiments with this unique catalyst have confirmed that beneficial results can be achieved with this catalyst in a substantially water-free environment, I have now ascertained that a catalytic reforming process using this bimetallic catalyst can be substantially further improved by carefully controlling the amount of water, or its equivalent, which is introduced into the reforming zone within a relatively narrow range. More specifically, I have observed that the initially excellent activity or selectivity characteristics which this catalyst manifests in a substantially water-free environment are subject to degradation after an initial period corresponding to that required to process about 0.5 to about 15 barrels of hydrocarbon per pound of catalyst. Quite surprisingly, I have now determined that this performance degradation can be reversed by the addition of a critical amount of water, or its equivalent, to the reforming zone. And further, I have also determined that this performance degradation can be eliminated entirely if the process is started up and continuously operated with a critical amount of water continuously entering the reforming zone. More specifically, my finding is that the total amount of water entering the reforming zone should be held within the range of about 10 to about 50 wt. ppm. of the gasoline fraction in order to obtain the beneficial response of this bimetallic catalyst to the presence of water. If the amount is below this level, activity and selectivity characteristics will not be stable, and if the amount is above this level, excessive yield loss and instability will occur. In short, the present invention essentially involves the concept of operating a reforming process with a unique bimetallic acidic catalyst that uses tin to promote a platinum group metal and with a critical amount of water continuously entering the reforming zone. An attendant finding is that the maximum benefits of water addition are realized when halogen is also simultaneously added to the reforming zone in an amount sufficient to maintain the mole ratio of water entering the reforming zone to halogen entering the zone within the range of about 10:1 to about 100:1.

It is accordingly, one object of the present invention to provide an improvement in a process for the catalytic reforming of the gasoline fraction with a catalytic composite comprising a combination of catalytically effective amounts of a platinum group component, a tin component and a halogen component with a porous carrier material. A second object is to provide a method for reversing activity and selectivity degradation in a reforming process of this type when it is operated in a "bone dry" condition. Another object is to provide a method for maintaining the activity and selectivity characteristics of a catalyst containing platinum, tin and halogen at a high level when it is utilized in a catalytic reforming operation.

Against this background, the present invention is in one embodiment a process for reforming a gasoline fraction which comprises continuously introducing into a reforming zone maintained at reforming conditions, the gasoline fraction, a hydrogen stream and water or a water-producing substance and therein contacting the resulting mixture with a catalytic composite comprising a combination of a platinum group component, a tin component and a halogen component with a porous carrier material. This catalytic composite contains these components in amounts sufficient to result in a composite containing, on an elemental basis, about 0.01 to about 2 wt. % platinum group metal, about 0.1 to about 5 wt. % tin and about 0.1 to about 3.5 wt. % halogen. Moreover, the total amount of water or water-producing substances continuously entering the reforming zone from any source is held to a level corresponding to about 10 to about 50 wt. ppm. of the gasoline fraction, calculated on the basis of equivalent water. Additionally, this catalytic composite has substantially all of the tin component uniformly dispersed throughout the porous carrier material in a particle size less than 100 Angstroms in maximum dimension and in a positive oxidation state and has substantially all of the platinum group component fixed in the elemental metallic state.

Another embodiment of the current invention is an improvement in a process for reforming a gasoline fraction wherein the gasoline fraction and a hydrogen stream are contacted, in a reforming zone maintained at reforming conditions, with a unique bimetallic catalytic composite of the type disclosed above in the first embodiment. Furthermore, this contacting is initially performed under substantially water-free conditions with no water addition and the catalyst is observed to possess excellent activity and selectivity characteristics. After an initial period corresponding to the processing of about 0.5 to about 15 barrels of hydrocarbon per pound of catalyst, these excellent characteristics are observed to decay at an accelerated rate. The improvement of the present invention in this embodiment involves adding water or a water-producing substance after this initial period to the reforming zone in an amount sufficient to establish and maintain the total amount of water, or its equivalent, entering the zone from any source in the range corresponding to about 10 to about 50 wt. ppm. of the gasoline fraction. The addition of water acts to sharply improve the activity and selectivity characteristics of the catalyst.

Other objects and embodiments of the instant invention involves additional details regarding suitable charge stocks, essential and preferred ingredients and amounts thereof for this unique catalyst, essential and preferred water and halogen additives for the instant process, operating conditions for use in the reforming process and the like particulars. These are hereinafter given in the following detailed discussion of the essential and preferred elements of the present invention.

Before considering in detail the various elements of the present invention, it is convenient to define several of the expressions and terms used in this disclosure. The expression "water entering the reforming zone" means the total quantity of water, or of substances which are converted to water under the conditions maintained within the reforming zone, which enters the reforming zone from any source calculated on the basis of equivalent water and expressed as wt. ppm. of the gasoline fraction which is also entering the reforming zone. The term "activity" refers to the ability of a catalyst to produce a $C_5+$ product of the required quality as measured by octane number at a given severity level where severity level means the conditions utilized: that is, inlet reactor temperature, reactor pressure, hydrogen to hydrocarbon mole ration and liquid hourly space velocity (LHSV). The term "selectivity" is intended to measure the ability of the catalyst when it is employed in a catalytic reforming process to produce $C_5+$ yield of the required octane relative to the amount of the gasoline fraction which is charged thereto. The term "stability" is intended to measure the ability of the catalyst to maintain initial levels of activity and selectivity; that is, it refers to the rate of change with time of the activity and selectivity parameters. It is to be noted that the term "catalyst" and "catalytic composite" are used herein in an interchangeable and equivalent manner.

The hydrocarbon charge stock that can be reformed in accordance with the improved process of the present invention is generally a gasoline fraction containing naphthenes, paraffins and aromatics. These gasoline fractions can include straight run gasolines, natural gasolines, synthetic gasolines, cracked gasolines and the like charge stocks. In some cases, it is advantageous to charge thermally or catalytically cracked gasolines, mixtures of straight run and cracked gasoline and various other mixtures of hydrocarbons which are well known to those skilled in the reforming art. Generally, the gasoline fraction will boil within the range of about 50° to about 425° F., with an initial boiling point of about 50° to about 300° F., and an end boiling point within the range of about 250° to 425° F. In many cases this gasoline fraction will be a high boiling fraction such as a heavy naphtha boiling within the range of $C_7$ to 400° F. It is also within the scope of the present invention to charge to the present invention pure paraffins, pure naphthenes or mixtures of paraffins and naphthenes which boil in the gasoline boiling range and which are to be converted to aromatics.

The concentrations of sulfur-containing compounds, nitrogen-containing compounds and of oxygen-containing compounds contained in this hydrocarbon charge stock must be carefully controlled. In general, it is essential that the concentrations of these contaminants be reduced to relatively low levels prior to the introduction of the charge stock into the instant process. Any suitable pretreatment method known to those skilled in the catalytic reforming art may be utilized to accomplish the desired reduction in contaminant levels. Typically, good results are obtained with a mild hydrogenation treatment; for example, by subjecting the hydrocarbon charge stock to hydrorefining, hydrotreating, hydrodesulfurization, and the like contaminant-removing processes. Usually, these pretreatment procedures involve contacting the charge stock and hydrogen with a suitable supported cobalt- and/or molybdenum-containing catalyst at conditions selected to result in cleavages of C-S, C-N, and C-O bonds. The details associated with these pretreatment methods are well known to those skilled in the art and will not be repeated here, but this required pretreatment is mentioned herein in order to emphasize the fact that these contaminants in the charge stock must be reduced to relatively low levels. In the case of sulfurous and nitrogenous contaminants, the desired level is less than 2 wt. ppm. of the charge stock and preferably less than 1 wt. ppm. of the charge stock of sulfur and nitrogen, respectively. The amount of water and water-producing compounds contained in the charge stock must likewise be reduced to a level less than 5 wt. ppm., calculated as equivalent water and preferably less than 1 wt. ppm. The purpose for removing all of the water and water-producing compounds from the hydrocarbon charge stock prior to its introduction into the reforming zone is designed to facilitate careful control of the water level continuously entering the reforming zone. It is possible that the critical amount of water necessary for the improvement of the present invention could be achieved by adjusting the severity level of the catalytic pretreatment so that the required amount of water or water-equivalent is left in the partially treated charge stock; however, this last procedure would be extremely difficult to accomplish except in the case where the sulfurous and nitrogenous contaminants in the untreated stock are extremely low. In sum, the hydrocarbon charge stock passed to the process of the present invention should be substantially free of sulfurous, nitrogenous and water-producing contaminants.

The unique bimetallic catalyst used in the present invention comprises a porous carrier material or support having combined therewith catalytically effective amounts of a platinum group component, a tin component and a halogen component. Considering first the porous carrier material, it is preferred that the material be a porous, adsorptive, high surface area support having a surface area of about 25 to about 500 $m^2/g$. The porous carrier material should be relatively refractory to the conditions utilized in the hydrocarbon conversion process, and it is intended to include within the scope of the present invention carrier materials which have traditionally been utilized in dualfunction hydrocarbon conversion catalysts such as: (1) activated carbon, coke, or charcoal; (2) silica or silica gel, clays and silicates including those synthetically prepared and naturally occurring, which may or may not be acid treated; for example, attapulgus clay, china clay, diatomaceous earth, fuller's earth, kaoline, kieselguhr, pumice, etc.; (3) ceramics, porcelain, crushed firebrick, and bauxite; (4) refractory inorganic oxides such as alumina, titanium dioxide, zirconium dioxide, chromium oxide, zinc oxide, magnesia, thoria, boria, silica-alumina, silica-magnesia, chromia-alumina, alumina-boria, silica-zirconia, etc.; (5) zeolitic crystalline aluminosilicates such as naturally occurring or synthetically prepared mordenite and/or faujasite, either in the hydrogen form or in a form which has been treated with multi-valent cations; and, (6) combinations of one or more elements from one or more of these groups. The preferred porous carrier materials for use in the present invention are refractory inroganic oxides with best results obtained with an alumina carrier material. Suitable alumina materials are the crystalline aluminas known as the gamma-, eta-, and theta-alumina, with gamma- and eta-alumina giving best results. In addition, in some embodiments the alumina carrier material may contain minor proportions of other well known refractory inorganic oxides such as silica, zirconia, magnesia, etc.; however, the preferred carrier material is substantially pure gamma- or eta-alumina. Preferred carrier materials have an apparent bulk density of about 0.3 to about 0.7 g/cc and surface area characteristics such that the average pore diameter is about 20 to 300 Angstroms, the pore volume is about 0.1 to about 1 cc/g and the surface area is about 100 to about 500 $m^2/g$. In general, best results are typically obtained with a gamma-alumina carrier material which is used in the form of spherical particles having: a relatively small diameter (i.e., typically about 1/16 inch), an -apparent bulk density of about 0.5 g/cc, a pore volume of about 0.4 cc/b, and a surface area of about 175 $m^2/g$.

The preferred alumina carrier material may be prepared in any suitable manner and may be synthetically prepared or natural occurring. Whatever type of alumina is employed it may be activated prior to use by one or more treatments including drying, calcination, steaming, etc., and it may be in a form known as activated alumina, activated alumina of commerce, porous alumina, alumina gel, etc. For example, the alumina carrier may be prepared by adding a suitable alkaline reagent such as ammonium hydroxide, to a salt of aluminum such as aluminum chloride, aluminum nitrate, etc., in an amount to form an aluminum hydroxide gel which upon drying and calcining is converted to alumina. The alumina may be formed in any desired shape such as spheres, pills, cakes, extrudates, powders, granules, etc., and utilized in any desired size. For the purpose of the present invention, a particularly preferred form of alumina is the sphere; and alumina spheres may be continuously manufactured by the well known oil drop method which comprises: forming an alumina hydrosol by any of the techniques taught in the art and preferably by reacting aluminum metal with hydrochloric acid, combining the hydrosol with a suitable gelling agent and dropping the resultant mixture into an oil bath maintained at elevated temperatures. The droplets of mixture remain in the oil bath until they set and form hydrogel spheres. The spheres are then continuously withdrawn from the oil bath and typically subjected to specific aging treatments in oil and an ammoniacal solution to further improve their physical characteristics. The resulting aged and gelled particles are then washed and dried at relatively low temperature of about 300° F. to about 400° F. and subjected to a calcination procedure at a temperature of about 850° F. to about 1300° F. for a period of about 1 to about 20 hours. This treatment effect conversion of the alumina hydrogel to the corresponding crystalline gamma-alumina. See the teachings of U.S. Pat. No. 2,620,314 for additional details.

One essential constituent of the unique bimetallic composite used in the present invention is a tin component, and it is an essential feature of the present invention that substantially all of the tin component in the composite is in an oxidation state above that of the elemental metal. That is, it is believed that best results are obtained when substantially all of the tin component exists in the catalytic composite in the +2 or +4 oxidation state. Accordingly, the tin component will be present in the composite as a chemical compound such as the oxide, sulfide, halide, oxyhalide, oxysulfide and the like wherein the tin moiety is in a positive oxidation state, or in chemical combination with the carrier material in a manner such that the tin component is in a positive oxidation state. Controlled reduction experiments with the catalytic composites produced by the preferred methods of preparing the instant catalytic composite have established that the tin component in these catalysts is in a positive oxidation state and is not reduced by contact with hydrogen at temperatures in the range of 1000° to 1200° F. It is important to note that this limitation on the oxidation state of the tin component requires extreme care in preparation and use of the present catalyst to insure that it is not subjected to a reducing atmosphere at temperatures above 1200° F. Equally significant is my observation that it is only when the tin component is in a uniformly dispersed state in the carrier material that it has the capability to maintain its positive oxidation state when subjected to hereinafter described prereduction step. Stated another way, if the tin component is not properly dispersed on the support it can be reduced in the prereduction step and result in an inferior catalyst. Based on the evidence currently available it is believed that best results are obtained when the tin component is present in the catalyst as tin oxide. The term "tin oxide" as used herein refers to a coordinated tin-oxygen complex which is not necessarily stoichiometric.

Interrelated with this oxidation state limitation are the factors of dispersion of the tin component in the support and of particle size of the tin component. This interrelationship emanates from my observation that it is only when the tin component is uniformly dispersed throughout the carrier material in a particle size having a maximum dimension less than 100 Angstroms that it can successfully maintain its preferred oxidation state when it is subjected to a high temperature prereduction treatment as hereinafter described. Thus it is an essential feature of my invention that the catalytic composite is prepared in a manner selected to meet the stated particle size and uniform dispersion limitations. By the use of the expression "uniform dispersion of the tin component in the carrier material" it is intended to describe the situation where the concentration of the tin ingredient is approximately the same in any divisable portion of the carrier material. Similarly, the expression "particles having a maximum dimension less than 100° A" is intended to denote particles that would pass through a sieve having a 100° A mesh size if it were possible to make such a sieve.

The tin component may be incorporated into the catalytic composite in any suitable manner known to effectively disperse this component throughout the carrier material in the required particle size. Thus this component may be added to the carrier by a coprecipitation or cogellation of a suitable soluble tin salt with the carrier material, by ion-exchange of suitable tin ions with ions contained in the carrier material when the ion exchange sites are uniformly distributed throughout the carrier or controlled impregnation of the carrier material with a suitable soluble tin salt under conditions selected to result in penetration of all sections of the carrier material by the tin component. One preferred method of incorporating the tin component involves coprecipitating it during the preparation of the preferred carrier material, alumina. This method typically involves the addition of a suitable soluble tin compound such as stannous or stannic chloride to an alumina hydrosol, mixing these ingredients to obtain a uniform distribution of the tin moiety throughout the sol and then combining the hydrosol with a suitable gelling agent and dropping the resulting mixture into an oil bath etc., as explained in detail hereinbefore. After drying and calcining the resulting gelled carrier material there is obtained an intimate combination of alumina and tin oxide having the required dispersion and particle size. Another preferred method of incorporating the tin component into the catalytic composite involves utilization of a soluble, decomposable compound of tin to impregnate the porous carrier material. In general, the solvent used in this impregnation step is selected on the basis of the capability to dissolve the desired tin compound and to hold the tin moiety in solution until it is evenly distributed throughout the carrier material and is preferably an aqueous, rather strongly acidic solution. Thus the tin component may be added to the carrier material by commingling the latter with an aqueous, acidic solution of suitable tin salt or suitable compound of tin such as stannous bromide, stannous chloride, stannic chloride, stannic chloride pentahydrate, stannic chloride diamine, stannic trichloride bromide, stannic chromate, stannous flouride, stannic fluoride, stannic iodide, stannic sulfate, stannic tartrate and the like compounds. The acid used in the impregnation solution may be any organic or inorganic acid that is capable of maintaining the pH of the impregnation solution in the range of about −1 or less to about 3 and preferably less than 1 during the impregnation step and that does not contaminate the resultant catalyst. Suitable acids are: inorganic acids such as hydrochloric acid, nitric acid, and the like; and stongly acidic organic acids such as oxalic acid, malonic acid, citric acid and the like. A particularly preferred impregnation solution comprises stannic or stannous chloride dissolved in a hydrochloric acid solution containing HCl in an amount corresponding to at least about 5wt. % of the carrier material which is to be impregnated. Another useful impregnation solution is stannous or stannic chloride dissolved in an anhydrous alcohol such as ethanol. In general, the tin component can be incorporated either prior to, simultaneously with, or after the platinum group component is added to the carrier material. However, I have found that excellent results are obtained when the tin component is incorporated simultaneously with the platinum group component. In fact, I have determined that a preferred aqueous impregnation solution contains chloroplatinic acid, a relatively high amount of hydrogen chloride, and stannic or stannous chloride.

Regardless of which tin compound is used in the preferred impregnation step, it is essential that the tin component be uniformly distributed throughout the carrier material. In order to achieve this objective with an aqueous impregnation solution it is necessary to dilute the impregnation solution to a volume which is approximately equal or substantially in excess of the volume of the carrier material which is impregnated and to add a relatively strong acid such as hydrochloric acid, nitric acid and the like to the impregnation solution in an amount calculated to maintain the pH of the impregnation solution in a range of about −1 or less to about 3, preferably less than 1. It is preferred to use a volume ratio of impregnation solution to carrier material of at least 0.5:1 and preferably about 1:1 to about 10:1 or more. Similarly, it is preferred to use a relatively long contact time during the impregnation step ranging from about ¼ hour up to about ½ hour or more before drying to remove excess solvent in order to insure a high dispersion of the tin component into the carrier material. The carrier material is, likewise, preferably constantly agitated during this preferred impregnation step.

This unique bimetallic catalyst also contains a platinum group component. Although the process of the present invention is specifically directed to the use of a catalytic composite containing platinum, it is intended to include other platinum group metals such as palladium, rhodium, ruthenium, osmium, and iridium. The platinum group component, such as platinum, may exist within the final catalytic composite as a compound such as an oxide, sulfide, halide, oxyhalide, oxysulfide, etc., or as an elemental metal or in combination with one or more of the other ingredients of the catalyst. From the evidence currently available it is believed that best results are obtained with this catalyst when substantially all of the platinum group component exists therein in the elemental state and the hereinafter described prereduction step is believed to accomplish this objective. Generally, the amount of the platinum group component present in the final catalyst composite is small compared to the quantities of the other components combined therewith. In fact, the platinum group component generally comprises about 0.01 to about 2 wt. % of the final catalytic composite calculated on an elemental basis. Excellent results are obtained when the catalyst contains about 0.05 to about 1 wt. % of the platinum group metal. The preferred platinum group component is platinum metal, although good results are also obtained when it is palladium metal or iridium metal.

The platinum group component may be incorporated in the catalytic composite in any suitable manner such as coprecipitation or cogellation with the preferred carrier material, or ion exchanged or impregnation thereof. The preferred method of preparing the catalyst involves the utilization of a water-soluble, decomposable compound of a platinum group metal to impregnate the carrier material. Thus, the platinum group component may be added to the support by commingling the latter with an aqueous solution of chloroplatinic, chloroiridic or chloropalladic acid. Other water-soluble compounds of platinum group metals may be employed in impregnation solutions and include ammonium chloroplatinate, bromoplatinic acid, platinum dichloride, patinum tetrachloride hydrate, platinum dichlorocarbonyldichloride, dinitrodiaminoplatinum, palladium dichloride, palladium nitrate, palladium sulfate, etc. The utilization of a platinum group compound containing halogen, such as chloroplatinic or chloropalladic acid, is preferred since it facilitates the incorporation of both the platinum group component and at least a minor quantity of the halogen in a single step. Hydrogen chloride or the like acid is also generally added to the impregnation solution in order to further facilitate the incorporation of the halogen component and to aid in the distribution of the platinum group component throughout the carrier material. In addition, it is generally preferred to impregnate the carrier material after it has been calcined in order to minimize the risk of washing away the valuable platinum metal compounds; however, in some cases it may be advantageous to impregnate the carrier material when it is in a gelled state.

Another essential constituent of the unique bimetallic catalyst is the halogen component. Although the precise form of the chemistry of the association of the halogen component with the carrier material is not entirely known, it is customary in the art to refer to the halogen component as being combined with the carrier material or with the other ingredients of the catalyst in the form of the halide (e.g. chloride or fluoride). This combined halogen may be either fluorine, chlorine, iodine, bromine, or mixtures thereof. Of these, fluorine and particularly chlorine are preferred. The halogen may be added to the carrier material in any suitable manner either during preparation of the carrier material or before or after the addition of the other components. For example, the halogen may be added at any stage of the preparation of the carrier material or to the calcined carrier material as an aqueous solution of a suitable water-soluble halogen-containing compound such as hydrogen fluoride, hydrogen chloride, hydrogen bromide, ammonium chloride, etc. The halogen component or a portion thereof may be combined with the carrier material during the impregnation of the latter with the platinum group component; for example, through the utilization of a mixture of chloroplatinic acid and hydrogen chloride. In another situation, the alumina hydrosol which is typically utilized to form the preferred alumina carrier material may contain halogen and thus contribute at least a portion of the halogen component to the final composite. For reforming, the halogen is combined with the carrier material in an amount sufficient to result in a final composite that contains about 0.1 to about 3.5 wt. % and preferably about 0.5 to about 1.5% by weight of the halogen calculated on an elemental basis. The preferred halogen component is chlorine or a compound of chlorine.

Regarding the amount of the tin component contained in the improved composite, it is preferably sufficient to constitute about 0.01 to about 5 wt. % of the final composite, calculated on an elemental basis, although substantially higher amounts of tin may be utilized in some cases. Best results are typically obtained with about 0.1 to about 1 wt. % tin. Irrespective of the absolute amounts of the tin component and the platinum group component utilized, the atomic ratio of tin to the platinum group metal contained in the bimetallic catalyst is preferably selected from the range of about 0.1:1 to about 3:1, with best results achieved at an atomic ratio of about 0.5:1 to 1.5:1. This is particularly true when the total content of the tin component plus the platinum group component in the catalytic composite is fixed in the range of about 0.15 to about 2 wt. % thereof, calculated on an elemental tin and platinum group metal basis.

Regardless of the details of how the components of the bimetallic catalyst are combined with the porous carrier material, the final catalyst generally will be dried at a temperature of about 200° to about 600° F. for a period of about 2 to about 24 hours or more, and finally calcined or oxidized at a temperature of about 700° F. to about 1100° F. in an air atmosphere for a period of at least about 0.5 to about 10 hours in order to convert substantially all of the metallic components to the oxide form. Best results are generally obtained when the halogen content of the catalyst is adjusted during the oxidation step by including a halogen or a halogen-containing compound in the air atmosphere utilized. In particular, when the halogen component of the catalyst is chlorine, it is preferred to use a mole ratio of $H^2O$ to HCl of about 20:1 to about 100:1 during at least a portion of the calcination step in order to adjust the final chlorine content of the catalyst to a range of about 0.5 to about 1.5 wt %.

It is essential that the resultant oxidized catalytic composite be subjected to a reduction step with a substantially water-free reduction agent prior to its use in the conversion of hydrocarbons. This step is designed to selectively reduce the platinum component and to insure a uniform and finely divided dispersion of the metallic components throughout the carrier material. Preferably, substantially pure and dry hydrogen (i.e., less than 20 vol. ppm. $H_2O$) is used as the reducing agent in this step. A stream of the reducing agent is contacted with the oxidized catalyst at conditions, including a temperature of about 600° F. to about 1200° F., a gas hourly space velocity of about 100 to 1000 or more $hr.^{-1}$, and for a period of about 0.5 to 10 hours, selected to reduce substantially all of the platinum-group component to the metallic state while maintaining substantially all of the tin component in an oxidation state. This reduction step may be performed in situ as part of a startup sequence if precautions are taken to predry the plant to a substantially water-free state and if substantially water-free hydrogen is used. Preferably at least the initial portion of the reduction is done slowly (i.e., at lower temperatures) in order to minimize the adverse effects of the water formed by the reduction reaction.

The resulting reduced catalytic composite may, in some cases, be beneficially subjected to a presulfiding step designed to incorporate in the catalytic composite from about 0.05 to about 0.5 wt. % sulfur calculated on an elemental basis. Preferably, this presulfiding treatment takes place in the presence of hydrogen and a suitable decomposable sulfur-containing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide containing about 10 moles of hydrogen per mole of hydrogen sulfide at conditions sufficient to effect the desired incorporation of sulfur, generally including a temperature ranging from about 50° F. up to about 1000° F. It is generally a good practice to perform this presulfiding step under substantially water-free conditions.

According to the present invention, a mixture of a hydrocarbon charge stock, water or a water-producing substance and a hydrogen stream are contacted with the unique bimetallic catalyst described hereinbefore in a reforming zone maintained at reforming conditions. This contacting may be accomplished by means of any of the systems disclosed in the art for bringing together these reactants with the catalyst, such as a fixed bed system, a moving bed system, a fluidized catalyst system or a batch type operation; however, in view of the danger of attrition losses of the valuable catalyst and of well known operational advantages, it is preferred to use a fixed bed system. In this system, a hydrogen-rich gaseous stream and the charge stock are preheated by any suitable preheating means to the desired reaction temperature and then are passed in admixture with water or a waterproducing compound into the reforming zone containing a fixed bed of this unique bimetallic catalyst. It is, of course, understood that the reforming zone may be one or more separate reactors with suitable heating means therebetween to compensate for the endothermic nature of the reactions taking place in a catalytic reforming zone. It is also to be noted that the reactants are typically in vapor phase, and may be contacted with the catalyst bed in either upward, downward, or radial flow fashion, with the latter being preferred.

In one mode of operation of the improved process of the present invention, the reforming process is started-up and linedout under substantially water-free conditions which are achieved by avoiding the use of water additives and by careful control of the well-known sources of water involved in a catalytic reforming system. This substantially water-free condition is ordinarily achieved by carefully drying both the catalyst and the reforming system during the start-up of the process by circulating them through a relatively dry gas stream at a relatively high temperature. Coupled with this initial drying step, it is ordinarily a good practice to dry both the hydrogen-rich gas stream and the hydrocarbon charge stock to relatively low levels. In many cases, the efficiency of the catalytic contaminant-removing pretreatment operation on the hydrocarbon charge stock is sufficient to insure that the amount of water, or its equivalent, contained in the charge stock is less than 5 wt. ppm. and more typically less than 1 wt. ppm. In consequence, the hydrocarbon charge stock does not ordinarily have to be dried when it has been properly pretreated. Similarly, the hydrogen-rich stream is ordinarily a recycle stream obtained from the effluent of the reforming zone, and if the hydrocarbon charge stock has been properly pretreated, the hydrogen stream will ordinarily contain less than 10 vol. ppm. of water and not require any further drying. On the other hand, in the case where water enters the system from any source, either due to improper treatment of the charge stock or due to improper drying of the catalyst or the reforming zone, it is within the scope of the present invention to use suitable drying means to dry the charge stock and the recycle hydrogen stream. Suitable drying means are conventional solid adsorbents or desiccants having a high selectivity for water such as silica gel, activated alumina, molecular sieves, anhydrous calcium sulfate, high surface area sodium and the like materials. Regardless of how this substantially water-free condition is obtained, it is quantitatively defined to be achieved when the total amount of water, or its equivalent entering the reforming zone is fixed at a level less than 10 wt. ppm. of the charge stock and preferably less than 5 wt. ppm. of the charge stock. In accordance with this first mode of operation, this substantially water-free state is maintained for an initial period corresponding to the amount of time necessary to process about 0.5 to about 15 barrels of the gasoline fraction per pound of catalytic composite. This water-free operation is generally continued until some degradation in the activity and selectivity characteristics of the catalyst is noted. Ordinarily, a preferred criterion for monitoring these characteristics is $C_5+$ yield, and when this parameter starts to rapidly decay, this first period should be terminated. A preferred procedure is to terminate when the initial line-out value of $C_5+$ yield has dropped about 1 to 2 vol. % or more. An alternative criterion which can also be utilized is based on the purity of the hydrogen recycle stream —— a marked deviation in this last parameter from initial value being also indicative of the onset of process instability. After this water-free operation is terminated, water injection is commenced in the manner hereinafter indicated.

A second mode of operation of the improved process of the present invention involves the presence of the hereinafter specified critical amount of water during the start-up of the process and continuously thereafter. In this mode of operation, it is necessary to carefully control all of the sources of water entering the reforming zone so that a process is started up and lined-out with the required quantity of water continuously entering the zone. Any of the drying means mentioned above in the discussion of the first mode of operation may be utilized to achieve the desired water level. In fact, as was pointed out hereinbefore, ordinarily the water level in the charge stock has been reduced to extremely low levels by the catalytic pretreatment procedure coupled with the customary stripping step which follows this pretreatment. In this latter case, it is generally only required to add the required amount of water or its equivalent to the hydrocarbon charge stock in order to control the water level to the reforming zone.

Regardless of which mode of operation is used, it is an essential feature of my invention that at some point in the process water or a water-producing substance is continuously introduced into the reforming zone in an amount corresponding to about 10 to about 50 wt. ppm., and most preferably about 25 wt. ppm., of the hydrocarbon charge stock, calculated on an equivalent water basis. It is to be noted that this amount of water is intended to include the total amount of equivalent water entering the reforming zone in any manner including that contained in the hydrocarbon charge stock, that present in the hydrogen stream, and that independently introduced into the reforming zone. Depending upon whether or not the recycle hydrogen stream is dried, it is generall a preferred procedure to add either all or a portion of the required amount of water to the charge stock. In the cases where once through hydrogen is used or where the recycle hydrogen stream is dried down to a level substantially less than 5 vol. ppm. water and water is not independently introduced into the zone, substantially all of the water entering the reforming zone will come from that admixed with the hydrocarbon charge stock. On the other hand, in the case where the recyclle hygrogen stream is not dried, an amount of water introduced into the charge stock will buildup and accumulate in the recycle hydrogen stream until an equilibrium condition is established. Depending upon the hydrogen to hydrocarbon mole ratio used, at equilibrium conditons, the total amount of water entering the reforming zone in this latter case will be approximately two to six times the amount added to the charge stock. It is to be noted that at least a portion of the required amount of water can be introduced into the zone by saturating a portion of the hydrogen stream with water.

The preferred procedure for control of water is to pretreat the hydrocarbon charge stock so that the amount of water or water-producing substances contained therein is substantially less than 5 wt. ppm. and more typically less than 1 wt. ppm. The required amount of water for the process of the present invention is then achieved by introducing into the reforming zone a suitable water-producing additive. In general, any suitable water-producing additive can be utilized to supply the required quantity of water to the reforming zone and these include water and substances which produce water under the conditions maintained within the reforming zone. Typical of these latter substances are oxygen and oxygen-containing organic compounds. Included within the class of suitable oxygen-containing organic compounds are aldehydes, ketones, alcohols, esters, and the like oxygen-containing organic compounds. For purposes of the present invention the preferred additive is an alcohol such as a $C_2$ to $C_8$ alcohol.

A preferred feature of the present invention is the use of a halogen additive in conjunction with the essential water additive. That is, it is preferred to add a halogen additive simultaneously with the water additive in an amount sufficient to result in a mole ratio of water entering the reforming zone to halogen entering the reforming zone selected from the range of about 10:1 to about 100:1, with best results obtained at a mole ratio of about 10:1 to about 60:1. This introduction of a halogen additive into the reforming zone can be most easily accomplished by adding a suitable halogen-containing compound to one of the streams entering the reforming zone. The preferred method is ordinarily to admix a halogen or a halogen-containing compound with the hydrocarbon charge stock. Although any of the halogens can be utilized for the purposes of the present invention, ordinarily best results are obtained when the halogen additive is chlorine or a chlorine-containing compound. Any suitable halogen additive can be utilized provided it is convertible at the conditions maintained in the reforming zone at least in part to the corresponding halide. Of course, hydrogen halide, per se, may be also used. Examples of suitable halogen additives are hydrogen chloride, hydrogen bromide, ammonium chloride, ammonium bromide, carbon tetrachloride and any of the $C_2$-$C_8$ alkyl halides. Excellent results are typically obtained with a $C_2$-$C_8$ alkyl chloride.

The reforming zone containing the unique bimetallic catalyst is operated under reforming conditions selected to produce a high-octane $C_5+$ reformate. Although the pressure used in the reforming zone can range from about 0 to about 1000 psig., the preferred pressure range is about 50 to about 350 psig. Similarly, the temperature maintained at the inlet to the reforming zone is selected from the range of about 800 to about 1100°F. In addition, hydrogen is charged to the reforming zone in an amount sufficient to produce a hydrogen to hydrocarbon mole ratio of about 2:1 to about 20:1, with best results ordinarily obtained at a mole ratio of about 4:1 to 10:1. It is to be noted that this hydrogen may be supplied to the reforming zone on a once-through basis, although, the preferred procedure is to obtain the necessary hydrogen from the effluent recovered from the reforming zone. Another relevant parameter for the operation of this reforming zone is an LHSV which can in general be selected from the range of about 0.1 to about 10 hrs.$^{-1}$, with a value of about 0.5 to about 5 hrs.$^{-1}$ being preferred.

The following example is given to illustrate the benefits and advantages associated with the improvement of the present invention. The example is intended to be illustrative rather than restrictive.

In this Example, both catalyst "A" and "B" were a combination of platinum, tin and chlorine with a gamma-alumina carrier material in amounts sufficient to result in a catalyst containing 0.6 wt. % platinum, 0.4 wt. % tin, and 1 wt. % chlorine. Both catalysts were used in the form of 1/16 spherical particles having an apparent bulk density of 0.5 g/cc, a pore volume of about 0.35 cc/g and a surface area of about 160 m²/g.

Both catalysts were prepared by using gamma-alumina particles which were manufactured in accordance with the procedure disclosed in U.S. Pat. No. 2,620,314. Catalyst "A" was prepared by a double impregnation procedure using a first impregnation solution comprising an aqueous solution of stannic chloride and hydrogen chloride and a second impregnation solution comprising an aqueous solution of chloroplatinic acid and hydrogen chloride. After each impregnation, the catalyst was dried and oxidized in the manner previously described. Catalyst "B" was prepared by a co-impregnation procedure using an impregnation solution comprising stannous chloride, hydrogen chloride and chloroplatinic acid. After impregnation, the catalyst was dried and oxidized in the manner described hereinbefore. Both catalysts were prereduced according to the substantially water-free procedure disclosed hereinbefore.

The tests described in this example were performed in a laboratory-scale reforming plant of conventional design comprising a reactor containing the catalyst, a hydrogen separation zone, a debutanizer column and conventional heating, pumping, compressing and cooling means. The flow scheme utilized essentially involved heating a mixture of the gasoline fraction and the hydrogen recycle stream to the desired conversion temperature. The resulting mixture was then passed down-flow into a reactor containing the catalyst as a fixed bed. An effluent stream was then withdrawn from the reactor, cooled to about 55° F. and passed to a separating zone wherein a hydrogen-rich gas phase separated from a liquid hydrocarbon phase. A portion of the gas phase was then passed through a high surface sodium scrubber and the resulting substantially water-free hydrogen stream was then recycled to the reforming zone. The excess of hydrogen over that needed to sustain plant pressure was recovered as excess separator gas. Likewise, the hydrocarbon phase from the separating zone is withdrawn and passed to a debutanizer column wherein light ends were taken overhead and a $C_5+$ product reformate stream recovered as bottoms.

In all cases, the test utilized was a high severity reforming test which was designed to measure, on an accelerated basis, the activity, selectivity, and stability characteristics of the catalyst under the conditions of the test. Each run consisted of a series of periods of 24 hours each. Each of these test periods comprised a 12-hour line-out period followed by a 12 hour test period during which a product reformate was collected. The conditions employed in all runs were: reactor pressure of 100 psig., an LHSV of 1.5 hrs.$^{-1}$, a hydrogen to hydrocarbon mole ratio of 4:1 and an inlet reactor temperature which was continuously adjusted through the test in order to achieve and maintain a $C_5+$ target octane of 102 F-1 clear. It is to be emphasized that these are exceptionally severe conditions which are designed to reveal in a very short time period whether the catalyst being tested has superior reforming characteristics under the conditions of the test. In all of these runs, the same charge stock was utilized. Its characteristics are given in Table 1. It is to be noted that the charge stock contained approximately 5 wt. ppm. of equivalent water and in view of the fact that recycle scrubbing was employed, the total amount of water entering the reforming zone in the control cases was 5 wt. ppm. Of course, the runs in all cases were started up under carefully controlled conditions so that the other known sources of water, such as residual water in the plant and in the catalyst, were held to insignificant levels.

TABLE I

| ANALYSIS OF HEAVY KUWAIT NAPHTHA | |
|---|---|
| API Gravity at 60° F. | 60.3 |
| Initial boiling point, ° F. | 170 |
| 10% boiling point, ° F. | 195 |
| 50% boiling point, ° F. | 238 |
| 90% boiling point, ° F. | 316 |
| End boiling point, ° F. | 375 |
| Sulfur, wt. ppm. | 0.1 |
| Nitrogen, wt. ppm. | 0.1 |
| Aromatics, vol. % | 10 |
| Paraffins, vol. % | 70 |
| Naphthenes, vol. % | 20 |
| Water, wt. ppm. | 5 |
| Octane No., F-1 clear | 40 |

EXAMPLE

A series of tests were made with various amounts of water entering the reforming zone in order to study the effects of different levels of water on a reforming process utilizing this unique bimetallic reforming catalyst. Tests "A" and "B" were made with catalyst "A". Tests "C" and "D" were made with catalyst "B". The only material difference between these tests was the amount of water entering the reforming zone, and these amounts are presented in Table II for each of these tests. In addition, tests "B" and "D" were made with 1 wt. ppm. of t-butyl chloride added to the charge stock.

The results of these tests are presented in Tables III, IV and V in terms of observed reactor inlet temperatures necessary to achieve desired octane level in ° F., $C_5$ yield expressed as vol. % of the charge stock and recycle hydrogen purity expressed in mole %.

TABLE II

| AMOUNTS OF WATER USED IN TESTS, WT. PPM. | | | | | | | |
|---|---|---|---|---|---|---|---|
| Test/Period No. | 1 | 2 | 3 | 4 | 5 | 6 | 7 |
| A | 5 | 5 | 5 | 5 | 5 | 5 | — |
| B | 25 | 25 | 25 | 25 | 25 | 25 | — |
| C | 5 | 5 | 5 | 5 | 5 | 5 | 5 |
| D | 25 | 25 | 25 | 25 | 25 | 25 | 25 |
| Test/Period No. | 8 | 9 | 10 | 11 | 12 | 13 | 14 |
| A | — | — | — | — | — | — | — |
| B | — | — | — | — | — | — | — |
| C | 5 | 5 | 5 | 5 | 5 | 5 | 5 |
| D | 25 | 25 | 25 | 25 | 25 | 25 | 25 |

TABLE III

| OBSERVED REACTOR INLET TEMPERATURES, ° F. | | | | | | | |
|---|---|---|---|---|---|---|---|
| Test/Period No. | 1 | 2 | 3 | 4 | 5 | 6 | 7 |
| A | 969.5 | 979 | 987.5 | 994.5 | 1003.5 | 1010.5 | — |
| B | 972 | 983.5 | 989.5 | 993.5 | 998.5 | 1004.5 | — |
| C | 964 | 971.1 | 973 | 983 | 990 | 994 | 996.5 |
| D | 963 | 971.5 | 978.5 | 982 | — | 991 | 995.5 |

TABLE III-continued

| OBSERVED REACTOR INLET TEMPERATURES, °F. | | | | | | | |
|---|---|---|---|---|---|---|---|
| Test/Period No. | 8 | 9 | 10 | 11 | 12 | 13 | 14 |
| A | — | — | — | — | — | — | — |
| B | — | — | — | — | — | — | — |
| C | 1004 | 1007.5 | 1014 | 1020 | 1028 | 1038 | 1051.4 |
| D | 1001.5 | 1003 | 1009 | 1013.5 | 1019 | 1026 | 1033.5 |

TABLE IV

| OBSERVED C$_5$+ YIELDS, VOL. % | | | | | | | |
|---|---|---|---|---|---|---|---|
| Test/Period No. | 1 | 2 | 3 | 4 | 5 | 6 | 7 |
| A | 76.8 | 76.8 | 77.5 | 77.5 | 75.8 | 75.2 | — |
| B | 76.4 | 76.4 | 77.5 | 76.7 | 76.9 | 76.5 | — |
| C | 76.0 | 78.4 | 77.9 | 75.8 | 75.7 | 76.8 | 78.2 |
| D | 75.1 | 76.8 | 76.8 | 75.3 | — | 76.6 | 76.4 |
| Test/Period No. | 8 | 9 | 10 | 11 | 12 | 13 | 14 |
| A | — | — | — | — | — | — | — |
| B | — | — | — | — | — | — | — |
| C | 75.7 | 76.9 | 76.0 | 74.1 | 74.3 | 74.2 | 73.4 |
| D | 76.4 | 77.7 | 75.7 | 75.9 | 75.6 | 75.3 | 74.7 |

TABLE V

| OBSERVED HYDROGEN PURITY, MOLE % | | | | | | | |
|---|---|---|---|---|---|---|---|
| Test/Period No. | 1 | 2 | 3 | 4 | 5 | 6 | 7 |
| A | 86.3 | 86.5 | 86.8 | 84.3 | 85.2 | 84.6 | — |
| B | 86.0 | 85.8 | 87.6 | 86.4 | 86.5 | 86.4 | — |
| C | 85.2 | 87.2 | 86.6 | 85.1 | 84.8 | 85.8 | 86.1 |
| D | 84.8 | 86.8 | 87.0 | — | — | 86.9 | 86.8 |
| Test/Period No. | 8 | 9 | 10 | 11 | 12 | 13 | 14 |
| A | — | — | — | — | — | — | — |
| B | — | — | — | — | — | — | — |
| C | 84.5 | 86.5 | 86.2 | 84.2 | 82.4 | 82.3 | 80.4 |
| D | 86.0 | 88.1 | 85.3 | 85.4 | 85.4 | 84.6 | 84.3 |

With reference now to the data presented in Tables III, IV and V, it can be seen that water addition can be utilized to stabilize the catalyst. For example, by comparing the results of test "C" with test "D", it can be seen that the beneficial effects of water are manifest in the numbers for the temperature required to make octane, fr the C$_5$+ yield, and for hydrogen purity. In all cases there are significant improvements manifest in the test where water is added in an amount sufficient to achieve 25 wt. ppm. water introduced into the reforming zone.

It is intended to cover by the following claims all changes and modifications of the above disclosure of the present invention which would be self-evident to a man of ordinary skill in the catalytic reforming art.

I claim as my invention:

1. A process for catalytically reforming a gasoline fraction, which process comprises contacting the gasoline fraction and a hydrogen stream at reforming conditions with an activated catalytic composite comprising a combination of a platinum group component, a tin component and a halogen component with a porous carrier material in amounts sufficient to result in a catalyst containing, on an elemental basis, about 0.01 to about 2 wt. % platinum group metal, about 0.01 to about 5 wt. % tin and about 0.1 to about 3.5 wt. % halogen; wherein the tin component is uniformly dispersed throughout the porous carrier material in a particle size less than 100 Angstroms in maximum dimension and in a positive oxidation state; and wherein the catalytic composite has been activated by contacting with an activating gas comprising oxygen and a halogenating component selected from the group consisting of halogen and hydrogen halide at a temperature between 700° to 1100° F. for a time of at least 0.5 to about 10 hours and, thereafter, reduced by contacting the resulting activated catalytic composite with a substantially water-free reducing agent at reduction conditions selected to reduce substantially all of the platinum group component to the elemental metallic state while maintaining substantially all of the tin component in an oxidation state above that of the elemental metal.

2. A process as defined in claim 1 wherein the platinum group component is platinum, iridium or rhodium.

3. A process as defined in claim 1 wherein the tin component is tin oxide.

4. A process as defined in claim 1 wherein the halogen component is combined halide.

5. A process as defined in claim 1 wherein the porous carrier material is a refractory inorganic oxide.

6. A process as defined in claim 5 wherein the refractory inorganic oxide is alumina.

7. A process as defined in claim 1 wherein the halogenating component of the activating gas is hydrogen chloride.

8. A process as defined in claim 1 wherein the halogen component of the catalytic composite is combined halide.

9. A process in accordance with claim 1 wherein the activating gas contains water.

* * * * *